(12) United States Patent
Douieb

(10) Patent No.: US 12,512,780 B2
(45) Date of Patent: Dec. 30, 2025

(54) SUPPORT PLATE FOR PHOTOVOLTAIC PANELS

(71) Applicant: Yaniv Douieb, Tel Aviv (IL)

(72) Inventor: Yaniv Douieb, Tel Aviv (IL)

(73) Assignee: GYS Holding, Saint-Ouen-sur-Seine (FR)

( * ) Notice: Subject to any disclaimer, the term of this patent is extended or adjusted under 35 U.S.C. 154(b) by 0 days.

(21) Appl. No.: 18/036,345

(22) PCT Filed: Nov. 8, 2021

(86) PCT No.: PCT/IB2021/060316
§ 371 (c)(1),
(2) Date: May 10, 2023

(87) PCT Pub. No.: WO2022/101758
PCT Pub. Date: May 19, 2022

(65) Prior Publication Data
US 2023/0318519 A1     Oct. 5, 2023

(30) Foreign Application Priority Data
Nov. 11, 2020 (FR) ........................................ 2011573

(51) Int. Cl.
*H02S 20/23* (2014.01)

(52) U.S. Cl.
CPC .................................. *H02S 20/23* (2014.12)

(58) Field of Classification Search
CPC ......... H02S 20/23; Y02B 10/10; Y02B 10/20; Y02E 10/47; Y02E 10/50
See application file for complete search history.

(56) References Cited

U.S. PATENT DOCUMENTS

2010/0229923 A1 * 9/2010 Frolov .................. H01L 25/043
136/251
2017/0070183 A1    3/2017 Sabban

FOREIGN PATENT DOCUMENTS

| DE | 202007012888 U1 | 2/2009 | |
| DE | 202013004877 U1 | 6/2013 | |
| EP | 2144016 A1 * | 1/2010 | ............... E04D 3/30 |
| EP | 2541162 A1 | 1/2013 | |
| EP | 3143691 A1 | 3/2017 | |
| FR | 2961300 A1 * | 12/2011 | ............. F24J 2/4614 |

OTHER PUBLICATIONS

English machine translation of EP 2144016 A1 (Year: 2024).*
Machine translation of FR-2961300-A1 (Year: 2025).*

(Continued)

*Primary Examiner* — Angelo Trivisonno
(74) *Attorney, Agent, or Firm* — Grossman, Tucker, Perreault & Pfleger, PLLC

(57) ABSTRACT

The invention relates to a support plate (10) suitable for attaching and integrating a photovoltaic panel on a roof of a building, said support plate (10) being delimited transversely by a first lateral edge (14) and a second lateral edge (16) and longitudinally by a first upper edge (18) and a second towel edge (20), the support plate (10) comprising an elongation device (46) along at least a transverse direction and/or a longitudinal direction, for adapting the dimensions of the support plate (10) to the dimensions of the associated photovoltaic panel.

7 Claims, 3 Drawing Sheets

(56) References Cited

OTHER PUBLICATIONS

International Preliminary Report on Patentability from PCT Application No. PCT/IB2021/060316 mailed May 25, 2023 (English translation attached) (11 pages).
International Search Report and Written Opinion from PCT Application No. PPCT Application No. PCT/IB2021/060316 mailed Jan. 28, 2022 (English translation attached) (14 pages).

\* cited by examiner

SUPPORT PLATE FOR PHOTOVOLTAIC PANELS

CROSS REFERENCE TO RELATED APPLICATIONS

This application is a US National Stage Application of PCT/IB2021/060316, filed 8 Nov. 2021, and claims priority to French Foreign Patent Application FR2011573, filed 11 Nov. 2020, both of which are incorporated herein by reference in their entirety.

FIELD OF THE INVENTION

The present patent application relates to a support plate suitable for attaching and integrating a photovoltaic panel, which is designed to adapt to various photovoltaic panel dimensions.

PRIOR ART

The installation and attachment of photovoltaic panels is conventionally carried out using metal rail systems, which are heavy and require suitable means of transport.

Moreover, the installation of a metal rail system on the roof is difficult.

A support plate for a photovoltaic panel is also known in the prior art, and is described and shown in the document EP-A-3143691. Such a support plate is suitable for attaching and integrating a photovoltaic panel on a roof.

For this purpose, the support plate, which is mounted on the roof, in particular includes studs for supporting and attaching the photovoltaic panel to the support plate.

Remaining Technical Problem

Although the support plate of the type described in the document EP-A-3143691 allows for easy installation of a photovoltaic panel, it is only suitable for one size of photovoltaic panel.

DESCRIPTION OF THE INVENTION

The present invention in particular aims to overcome this drawback.

This objective, as well as others that will become apparent from the following description, is achieved with a support plate suitable for attaching and integrating a photovoltaic panel on a roof of a building, said support plate being delimited transversely by a first lateral edge and a second lateral edge and longitudinally by a first upper edge and a second lower edge, characterised in that the support plate includes an elongation device for elongation in at least a transverse direction and/or a longitudinal direction, for adapting the dimensions of the support plate to the dimensions of the associated photovoltaic panel.

This feature provides a photovoltaic panel support that can be adapted to photovoltaic panels of various dimensions.

Moreover, the elongation device allows the support plate to deform to absorb the dimensional variations of the associated photovoltaic panel caused by expansion effects.

According to other optional features of the invention, which can be implemented alone or in any combination thereof:

- the elongation device comprises at least a first elongation strip which extends longitudinally and which is capable of being extended or retracted to allow the support plate to be elongated or narrowed in a transverse direction perpendicular to said first elongation strip;
- said first elongation strip forms an accordion which comprises at least one longitudinal fold;
- said first elongation strip is made in one piece with the support plate. This feature facilitates the manufacture of the support plate according to the invention and makes it possible to obtain a one-piece support plate with improved handling;
- the elongation device comprises at least a second elongation strip which extends longitudinally and which is capable of being extended or retracted to allow the support plate to be elongated or narrowed in a transverse direction to said second elongation strip;
- the elongation device comprises at least a third elongation strip which extends transversally and which is capable of being extended or retracted to allow the support plate to be elongated or narrowed in a longitudinal direction perpendicular to said third elongation strip;
- it includes at least an upper stop and a lower stop opposite one another, which are arranged to cooperate with an upper edge and a lower edge respectively of a photovoltaic panel mounted on said support plate, to oppose the removal of the support plate longitudinally;
- it includes at least a first lateral stop and a second lateral stop opposite one another, which are arranged to cooperate with a first lateral edge and a second lateral edge respectively of a photovoltaic panel mounted on said support plate, to oppose the removal of the support plate transversally;
- it includes an inlet that is adapted to allow the air interposed between the photovoltaic panel and the support plate to be recovered.

The present invention further relates to an assembly comprising a support plate of the type described hereinabove and a photovoltaic panel mounted on said support plate.

BRIEF DESCRIPTION OF THE DRAWINGS

Other features and advantages of the invention will be better understood upon reading the following detailed description given with reference to the accompanying drawings, which illustrate.

For clarity purposes, identical or similar elements are identified with identical or similar references on all figures.

The terms longitudinal, vertical and transverse are also considered, in a non-limiting manner, with reference to the L, V, T trihedron shown in the figures.

Figure 1:
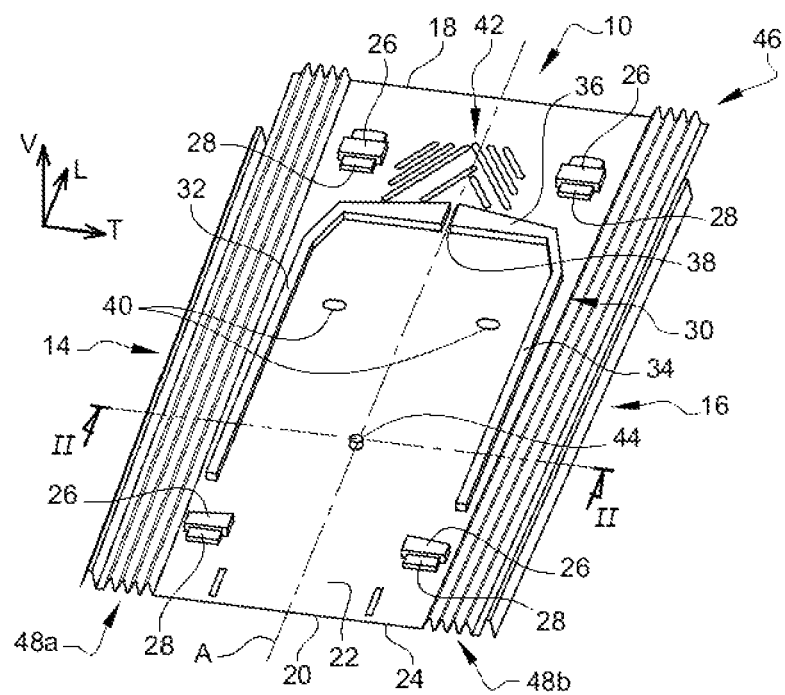
FIG. 1: a perspective view of a support plate including an elongation device according to a first embodiment of the invention.

Furthermore, in the description and the claims, the terms "upper" and "lower" will be used, in a non-limiting manner, to refer to the upper part and lower part respectively in FIG. 1 and with reference to the position of use of the support plate according to the invention on the roof of a building.

DETAILED DESCRIPTION OF EMBODIMENTS OF THE INVENTION

FIG. 1 shows a support plate 10 adapted for attaching and integrating a photovoltaic panel 12 (visible in FIG. 2) on the roof of a building.

The support plate 10 is intended to be arranged on a roof, typically such that it is inclined relative to a vertical axis, following the pitch of the roof.

The support plate 10 extends transversely from a first longitudinal lateral edge 14 to an opposite second longitudinal lateral edge 16.

Figure 3:
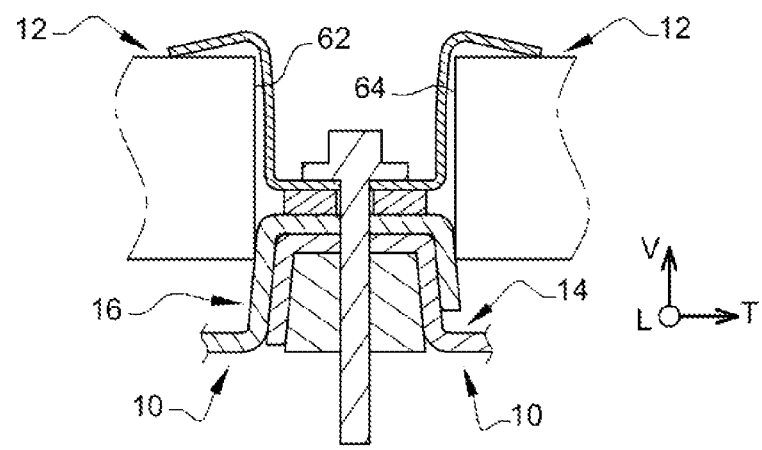
FIG. 3: a detailed cross-sectional view of the overlap and junction of two support plates such as that shown in FIG. 1.

It should be noted that the first lateral edge 14 and the second lateral edge 16 of the support plate 10 each have an overall inverted U-shaped cross-section, with the second lateral edge 16 being designed to overlap the first lateral edge 14 of a complementary shape, when two adjacent support plates 10 are juxtaposed transversely as shown in FIG. 3, to guarantee a good seal between the support plates 10.

Similarly, the support plate 10 extends longitudinally from a first transverse upper edge 18, to a second transverse lower edge 20.

Moreover, the support plate 10 has a front face 22 which is intended to be arranged facing the photovoltaic panel 12 and an opposite rear face 24 which is intended to be arranged facing the roof.

According to another aspect, with reference to FIG. 1, the support plate 10 includes four projecting studs 26 for positioning the photovoltaic panel 12, which allow the photovoltaic panel 12 to be positioned, guided and supported, and which allow the feet of the individuals fitting the photovoltaic panel 12 to be supported.

Furthermore, each positioning stud 26 is associated with a drilling area 28 which is arranged downstream of the associated positioning stud 26 in the direction of water run-off so as to be protected from the water flow. A drilling area 28 is understood to mean an area that is designed to allow for drilling and for the passage of the means (not shown) for attaching the photovoltaic panel 12. Each drilling area 28 can include a recess or mark indicating a drilling point, and/or a mechanically pre-weakened area to aid drilling for example.

The support plate 10 forms a ridge 30 which has an inverted U-shape, the ridge 30 comprising a first longitudinal portion 32, a second longitudinal portion 34 and an intermediate transverse upper portion 36. The ridge 30 is disposed so that the runoff water is diverted transversely to the sides.

Moreover, the ridge 30 has a slot 38 which is formed in the upper portion 36 of the ridge 30, to allow cables to pass between the support plate 10 and the photovoltaic panel 12.

In a complementary manner, the support plate 10 delimits two holes 40 for passing cables through the support plate 10.

As can be seen in FIG. 1, the plate 10 comprises a plurality of projecting baffle-forming guide rails 42, which are arranged upstream of the slot 38 in the direction of water flow, and which are arranged in an overall inverted V-shape to deflect the flow of water towards the edges of the support plate 10.

Furthermore, the support plate 10 includes a tubular inlet 44 which passes 130 through the front face 22 and which is designed to be connected to an extraction or ventilation device (not shown), such as a double-flow ventilation device for example. The inlet 44 is adapted to allow air that is heated by the photovoltaic panel 12 and contained between the photovoltaic panel 12 and the front face 22 of the support plate 10 to be recovered.

In accordance with the invention, the support plate 10 includes an elongation device 46 which allows the dimensions of the support plate 10 to be adapted to the dimensions of the associated photovoltaic panel 12.

Figure 2:
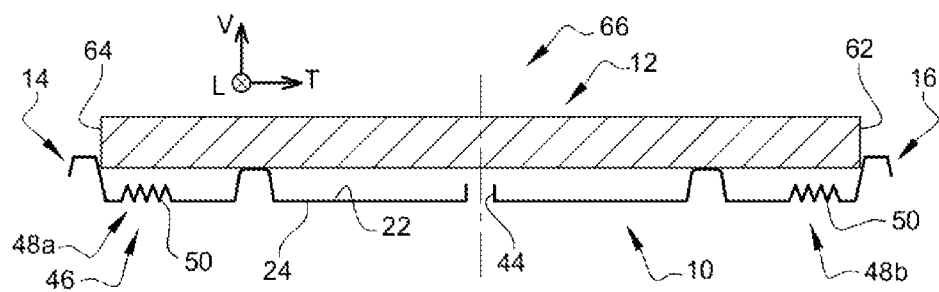
FIG. 2: a cross-sectional view of an assembly comprising a photovoltaic panel and the support plate in FIG. 1, along the line 2-2 in FIG. 1.

According to a first embodiment of the invention illustrated in FIGS. 1 and 2, the elongation device 46 comprises a first longitudinal elongation strip 48a and a second 140 longitudinal elongation strip 48b which each extend longitudinally over the entire length of the support plate 10.

Each longitudinal elongation strip 48a, 48b is capable of being extended or retracted to allow the support plate 10 to be elongated or narrowed in a transverse direction, perpendicular to the longitudinal elongation strips 48a, 48b.

The first elongation strip 48a is interposed between the first lateral edge 14 and the first longitudinal portion 32 of the ridge 30.

By axial symmetry along a median axis A of symmetry shown in FIG. 1, the second elongation strip 48b is interposed between the second lateral edge 16 and the second longitudinal portion 34 of the ridge 30.

Each longitudinal elongation strip 48a, 48b forms an overall sinusoidal accordion, which comprises a plurality of longitudinal folds 50, as can be seen in FIG. 2.

Moreover, each longitudinal elongation strip 48a, 48b is made in one piece with the support plate 10, for example by moulding using a plastic material.

It should be noted that the elongation strips 48a, 48b extend forwards such 155 that the rear face 20 of the support plate 10 has an overall planar shape to facilitate the installation of the support plate 10 on a roof.

Preferably, each longitudinal elongation strip 48a, 48b is elastically deformable, i.e. each elongation strip 48a, 48b is capable of being successively elongated and narrowed without undergoing plastic deformation.

By way of illustration, the elongation device 46 can be constituted by any other type of device to the one described hereinabove, adapted to allow the support plate 10 to be elongated and/or narrowed, such as a device (not shown) including guide rails on which the first lateral edge 14 and the second lateral edge 16 are mounted such that they slide transversally relative to a central portion of the support plate 10.

Similarly, again by way of illustration, the support plate 10 can be formed in two independent portions along the axis A of symmetry, and the elongation device 46 can include a pair of transverse rails on which the two independent parts of the support plate 10 are mounted such that they slide transversally.

Figure 4:
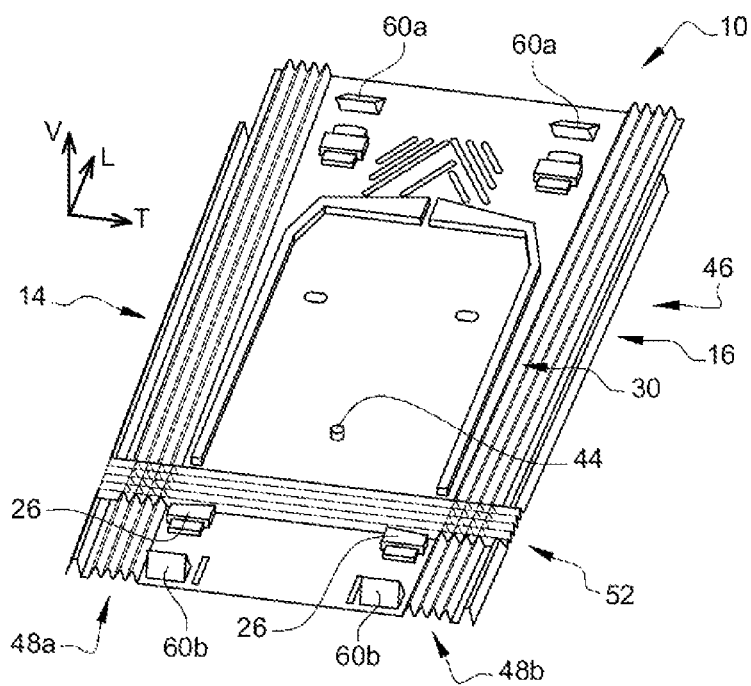
FIG. 4: a perspective view of the support plate according to a second embodiment of the invention.

According to a second embodiment of the invention shown in FIG. 4, the elongation device 46 comprises a third transverse elongation strip 52 which extends transversally over the entire width of the support plate 10 and which is capable of being extended or retracted to allow the support plate 10 to be elongated or narrowed in a longitudinal direction perpendicular to the third elongation strip 52. It should be noted that the third elongation strip 52 is in addition to the first and the second longitudinal elongation strips 48a, 48b.

The third transverse elongation strip 52 is interposed between the two lower positioning studs 26 and a lower end of the ridge 30.

Moreover, the third elongation strip 52 forms a sinusoidal accordion, which comprises a plurality of transverse folds 54, as can be seen in FIG. 4.

Moreover, the third elongation strip 52 is made in one piece with the support plate 10, for example by moulding using a plastic material.

Preferably, the third elongation strip 52 is elastically deformable, i.e. it is capable of being successively elongated and narrowed without undergoing plastic deformation.

Figure 5:
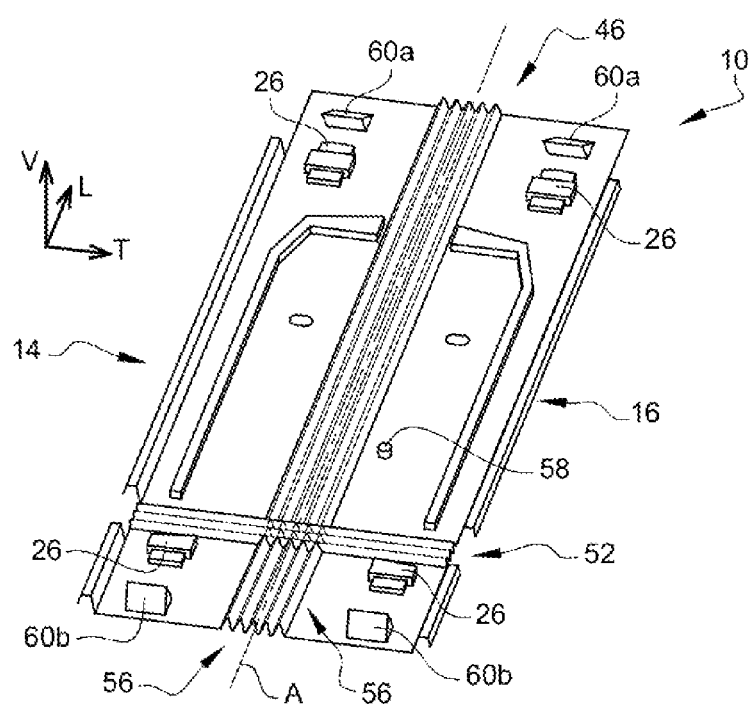
FIG. 5: a perspective view of the support plate according to a third embodiment of the invention.

According to a third embodiment of the invention illustrated in FIG. 5, the elongation device 46 comprises a single first longitudinal elongation strip 56 which is similar to the first longitudinal elongation strip 48a previously described in the first embodiment of the invention.

In contrast to the first embodiment of the invention, the first longitudinal elongation strip 56 according to the third embodiment is arranged in the centre of the support plate 10, along the axis A of symmetry, to allow the support plate 10 to be elongated or narrowed in a transverse direction, such that the positioning studs 26 are transversely spaced apart or brought closer together to adapt to the footing of the associated photovoltaic panel.

Furthermore, also according to the third embodiment of the invention, it should be noted that the third transverse elongation strip 52 described in the second embodiment of the invention is present.

Moreover, also according to the third embodiment of the invention, the support plate 10 comprises an off-centre inlet 58 which is adapted to allow air to be recovered.

According to another aspect of the invention, common to the second and third embodiments of the invention, the support plate 10 includes two upper stops 60a and two lower stops 60b opposite one another, which are arranged so as to cooperate with an upper edge and a lower edge (not shown) respectively of the photovoltaic panel 12 mounted on the support plate 10, in order to oppose the removal of the support plate 10 longitudinally, in particular in the event of elastic return generated by the third elongation strip 52.

More specifically, the third transverse elongation strip 52 can induce a longitudinal elastic return of the two parts of the support plate 10 that are arranged on either side of the third elongation strip 52.

Similarly, according to another aspect of the invention common to the three embodiments, the first lateral edge 14 and the second lateral edge 16 of the support plate 10 form a first lateral stop and a second lateral stop respectively which are arranged to cooperate with a first lateral edge 62 and a second lateral edge 64 respectively of the photovoltaic panel 12 mounted on the support plate 10, to oppose the removal of the support plate 10 transversally, as can be seen in FIG. 3.

However, in an alternative embodiment of the invention not shown, the first lateral edge 14 and the second lateral edge 16 of the support plate 10 can be flush with the positioning studs 26, to allow the photovoltaic panel 12 arranged on the support plate 10 to extend transversely beyond the first lateral edge 14 and the second lateral edge 16 of the support plate 10.

This feature in particular allows two photovoltaic panels 12 to be arranged in a landscape position, i.e. superimposed in a longitudinal direction, on two support plates 10 in a portrait position, such that the photovoltaic panels 12 and the associated support plates 10 are crossed.

This feature is made possible by the elongation device of the invention.

According to a preferred example embodiment, the support plate 10 is made of polypropylene by injection moulding.

In a non-limiting manner, the support plate 10 according to the invention can also be produced by any other type of suitable manufacturing method, in particular by thermoforming.

The present invention further relates to an assembly 66 illustrated in FIG. 2, which comprises a support plate 10 as described hereinabove and a photovoltaic panel 12 mounted on the support plate 10. The assembly 66 thus formed can be mounted and prepared on the ground before being mounted on a roof, for example, the mounting of the assembly 66 on the ground or in a workshop being easier than mounting it high up on a roof of a building.

The present description of the invention is given as a non-limiting example.

It should be understood that the invention is also intended to apply to a support plate 10 including an elongation device 46 comprising an elongation strip which extends longitudinally over the entire length of the support plate 10 and which extends transversely over the entire width of the support plate 10, to allow the support plate 10 to deform in at least a transverse direction and/or a longitudinal direction.

What is claimed is:

1. A support plate for attaching and integrating a photovoltaic panel on a roof of a building, said support plate being delimited transversely by a first lateral edge and a second lateral edge and longitudinally by a first upper edge and a second lower edge, the support plate comprising an elongation device for elongation in a transverse direction, the elongation device to adapt the dimensions of the support plate to the dimensions of the associated photovoltaic panel, wherein said support plate is a one-piece structure and said elongation device is elastically deformable.

2. The support plate according to claim 1, wherein the elongation device comprises at least a first elongation strip which extends longitudinally and configured to be extended or retracted to allow the support plate to be elongated or narrowed in a transverse direction perpendicular to said first elongation strip.

3. The support plate according to claim 2, wherein said first elongation strip forms an accordion which comprises at least one longitudinal fold.

4. The support plate according to claim 1, wherein said first elongation strip is made in one piece with the support plate.

5. The support plate according to claim 2, wherein the elongation device comprises at least a second elongation strip which extends longitudinally and which is configured to be extended or retracted to allow the support plate to be elongated or narrowed in a transverse direction to said second elongation strip.

6. The support plate according to a claim 1, further comprising at least a first lateral stop and a second lateral stop opposite one another, which are arranged to cooperate with a first lateral edge and a second lateral edge respectively of a photovoltaic panel mounted on said support plate, and to oppose the removal of the support plate transversally.

7. The support plate according to claim 1, further comprising an inlet that is adapted to allow the air interposed between a photovoltaic panel and the support plate to be recovered.

* * * * *